(12) United States Patent
Beekmann

(10) Patent No.: US 10,320,315 B2
(45) Date of Patent: Jun. 11, 2019

(54) METHOD FOR CONTROLLING WIND TURBINES

(71) Applicant: Wobben Properties GmbH, Aurich (DE)

(72) Inventor: Alfred Beekmann, Wiesmoor (DE)

(73) Assignee: Wobben Properties GmbH, Aurich (DE)

(*) Notice: Subject to any disclaimer, the term of this patent is extended or adjusted under 35 U.S.C. 154(b) by 225 days.

(21) Appl. No.: 14/909,703

(22) PCT Filed: Jul. 15, 2014

(86) PCT No.: PCT/EP2014/065143
§ 371 (c)(1),
(2) Date: Feb. 2, 2016

(87) PCT Pub. No.: WO2015/018613
PCT Pub. Date: Feb. 12, 2015

(65) Prior Publication Data
US 2016/0173017 A1 Jun. 16, 2016

(30) Foreign Application Priority Data

Aug. 6, 2013 (DE) .................. 10 2013 215 396

(51) Int. Cl.
*H02J 3/38* (2006.01)
*H02P 9/14* (2006.01)
*F03D 9/25* (2016.01)

(52) U.S. Cl.
CPC ............... *H02P 9/14* (2013.01); *F03D 9/255* (2017.02); *H02J 3/386* (2013.01); *Y02A 30/12* (2018.01); *Y02E 10/763* (2013.01)

(58) Field of Classification Search
CPC .. H02P 9/14; F03D 9/255; H02J 3/386; Y02E 10/763
See application file for complete search history.

(56) References Cited

U.S. PATENT DOCUMENTS

| 6,965,174 B2 | 11/2005 | Wobben |
| 7,638,893 B2 | 12/2009 | Wobben |
| 8,977,402 B2 | 3/2015 | Garcia |

(Continued)

FOREIGN PATENT DOCUMENTS

| CN | 102801181 A | 11/2012 |
| DE | 102010006142 A1 | 8/2011 |

(Continued)

OTHER PUBLICATIONS

Soman et al., "A Review of Wind Power and Wind Speed Forecasting Methods With Different Time Horizons," North American Power Symposium 2010, Arlington, TX, 8 pages.

(Continued)

*Primary Examiner* — Robert E Fennema
*Assistant Examiner* — Marzia T Monty
(74) *Attorney, Agent, or Firm* — Seed IP Law Group LLP

(57) ABSTRACT

A method for feeding electrical energy into an electrical supply grid by means of a wind turbine or wind farm, where the wind turbine or wind farm converts kinetic energy from wind with variable speed to electrical energy, a wind speed is predicted based on a wind forecast and a reactive power to be fed in is calculated as predicted reactive power based on the predicted wind speed.

13 Claims, 4 Drawing Sheets

(56) References Cited

U.S. PATENT DOCUMENTS

| | | | |
|---|---|---|---|
| 9,048,694 B2 * | 6/2015 | Pan | H02J 3/36 |
| 2002/0103745 A1 | 8/2002 | Lof et al. | |
| 2009/0212563 A1 * | 8/2009 | Morjaria | F03D 7/0284 |
| | | | 290/44 |
| 2010/0098540 A1 * | 4/2010 | Fric | F03D 7/0224 |
| | | | 416/36 |
| 2012/0059638 A1 * | 3/2012 | Garate Ivaro | F03D 7/0224 |
| | | | 703/9 |
| 2012/0143537 A1 * | 6/2012 | Nielsen | F03D 7/048 |
| | | | 702/60 |
| 2012/0217807 A1 | 8/2012 | Galler et al. | |
| 2013/0193766 A1 * | 8/2013 | Irwin | H02H 7/268 |
| | | | 307/82 |
| 2014/0084587 A1 | 3/2014 | Beekmann | |
| 2014/0300108 A1 | 10/2014 | Sahukari et al. | |

FOREIGN PATENT DOCUMENTS

| | | |
|---|---|---|
| EA | 201200193 A1 | 9/2012 |
| EP | 2381094 A1 | 10/2011 |
| JP | 2001-16783 A | 1/2001 |
| JP | 2011-229205 A | 11/2011 |
| JP | 2012-5310 A | 1/2012 |
| RU | 113615 U1 | 2/2012 |
| TW | 201231803 A | 8/2012 |
| WO | 2012130761 A2 | 10/2012 |
| WO | 2012171532 A2 | 12/2012 |
| WO | 2013044923 A1 | 4/2013 |

OTHER PUBLICATIONS

Flores et al., "Application of a control algorithm for wind speed prediction and active power generation," *Renewable Energy* 30:523-536, 2005.

Venayagamoorthy et al., "One Step Ahead—Short-Term Wind Power Forecasting and Intelligent Predictive Control Based on Data Analytics", IEEE power & energy magazine, Aug. 16, 2012, pp. 70-78.

* cited by examiner

METHOD FOR CONTROLLING WIND TURBINES

BACKGROUND

Technical Field

The present invention relates to a method for feeding electrical energy into an electrical supply grid by means of a wind turbine or wind farm. The present invention, moreover, relates to a wind turbine for feeding electrical energy into an electrical supply grid, and the present invention relates to a wind farm for feeding electrical energy into an electrical supply grid.

Description of the Related Art

Feeding electrical energy into an electrical supply grid by means of wind turbines or by means of a wind farm comprising several wind turbines is a matter of common knowledge. It is also known that the wind turbine or wind farm is not only responsible for feeding energy, but also for grid support. So, what is assumed here as an AC grid is a common electrical supply grid.

An early document that describes grid support by means of wind turbines is, for example, U.S. Pat. No. 6,965,174. This document describes, inter alia, the adjustment of the phase angle when feeding energy by means of a wind turbine. Later documents, such as document U.S. Pat. No. 7,638,893, also describe methods for a wind farm.

Such methods monitor the grid and possibly respond to changes in the grid. Nowadays, the share of wind energy in the grid has increased substantially, at least in some states or regions, so that the feeding of energy, and thus possibly also grid stability, may depend more and more on the prevailing wind conditions. This problem can be met by a temporary storing of energy. Such temporary storage systems may be, however, costly and often are not available in sufficient quantities, or at all.

The German Patent and Trademark Office has researched the following prior art: DE 10 2010 006 142 A1, U.S. Pat. No. 6,965,174 B2, U.S. Pat. No. 7,638,893 B2 and US 2011/0148114 A1.

BRIEF SUMMARY

One or more embodiments are directed to a method that uses a wind turbine or wind farm, and the wind turbine or wind farm converts kinetic energy from wind with variable wind speed to electrical energy. The fact that the wind speed is variable is considered, although this method is not about momentary values, but common mean values, such as a 10-second, 1-minute, or 10-minute mean value.

It is now further proposed to predict a wind speed based on a wind forecast. Such wind forecast or prediction of the wind speed can be made based on well-known, meteorological procedures. Preferably, the values of other wind turbines or wind farms are used, which, seen from the perspective of the current wind direction, are located before the here underlying wind turbine or wind farm.

What is then calculated based on such predicted wind speed, is a reactive power that is to be fed in, namely the predicted reactive power $Q_P$.

This is based on the finding that changes in wind speed may influence the behavior of the electrical supply grid or even its stability. For grid support purposes, a wind turbine or wind farm may, however, feed in a reactive power based on the wind speed or at least a reactive power that would make sense in light of the wind speed. However, such correlations that are to be expected are not necessarily definite, and they are, in particular, hardly—or not at all—foreseeable for devices or installations other than wind turbines, for example for a grid operator.

Now, if the behavior of a wind turbine or wind farm should change due to changing wind conditions, this may cause compensatory measures provided for, for example, by the grid operator. However, the wind turbine or wind farm provides also for such compensatory measures, and the two sets of compensatory measures may be poorly coordinated or may even offset each other. One important compensatory measure provided for by the wind turbine or wind farm may be the feeding of reactive power. To be able to better coordinate such compensatory measures, it is thus proposed that the wind turbine or wind farm should make a reactive power prediction already based on a wind forecast. This way, it will be possible to coordinate compensatory measures already at an early stage, even before they become necessary.

Preferably, it is thus also proposed to transmit the predicted reactive power as a forecast value to a grid control center that controls the electrical supply grid. In other words: the grid operator is informed about the reactive power that is to be fed in shortly by the wind turbine or wind farm. The grid operator, i.e., the grid control center, can thus better adapt to the situation.

What is preferably also calculated based on such predicted wind speed, is an active power that is to be fed in, namely the predicted active power $P_P$. Now, if a wind speed has been forecast that is greater than a mean storm wind speed, the predicted reactive power will be greater in terms of value than the predicted active power. What is viewed here is a storm situation, and the mean storm wind speed lies between a smallest wind speed of a storm, where a reduction of the active power begins, and a largest acceptable wind speed of a storm, where the active power to be fed in has reached the value of 0. So what is proposed here, in particular, is a solution for a storm situation that may be particularly critical to grid stability. This is in particular due to the fact that the wind speed in a storm may also vary rather strongly and that many of today's wind turbines are still designed and programmed such as to promptly reduce their performance to 0 for own protection or even go off line. This means that in storm conditions, one can expect particularly strong feeding fluctuations for wind turbines or wind farms.

Moreover, the storm-related reduction in active power can result in that the feed-in units of the wind turbines or wind farm have more capacity available for feeding reactive power due to the reduced active power. This effect is also used in accordance with one or more embodiments of the invention, and it is thus proposed to feed even more reactive power than active power into the grid. This way, one can at least influence the voltage levels in the grid, and the grid operator can respond to such influence.

According to one embodiment, it is proposed to predict the predicted reactive power for a forecast period. As regards such forecast period, it is now proposed for the wind turbines or wind farm to actually feed in the predicted reactive power, even if the wind speed actually reached should be different from the forecast wind speed. This way, a reliable value is created by the calculation and, in particular, transmission of the predicted reactive power. Others, in particular the grid operator, cannot only respond to, but even rely on that value, which will add to the grid's stability.

Moreover, this embodiment is also based on the finding that the reactive power that can be fed in depends only slightly, or possibly even not at all, on the wind speed. This means that it is possible to provide such a predicted reactive power, even though the wind shows different values. A problem might arise only if the capacity of the feed-in units of the wind turbines or wind farm cannot feed in the predicted reactive power due to an unexpectedly high active power feed. In that case, one could decide in consultation with the parties involved, in particular with the grid operator, not to feed in said reactive power, or one could otherwise reduce the active power feed in order to comply with the predicted, and thus basically the promised, reactive power feed.

Preferably, the predicted reactive power is calculated as a forecast value and possibly transmitted as such to the grid control center only if the predicted wind speed is greater than the smallest wind speed of a storm. It is thus specifically proposed to predict the reactive power only in the event of a storm. This makes specific allowance for the finding that a prediction of the reactive power is important especially in the event of a storm so as to have it available as a parameter for stabilizing the grid.

This also avoids an unnecessary calculation and possibly unnecessary transmission in less critical situations. This also makes it possible to avoid any commitment to a predicted reactive power if the wind speed is smaller than in storm situations. Unless a storm has come up, one can often expect less strongly and less spontaneously fluctuating wind speeds, especially in case of a wind farm where slight fluctuations disperse evenly across the wind farm and are less noticeable during feeding. Therefore, an overall more stable situation can be expected at such lower wind speeds, which can do without a reactive power prediction and can instead gear the feeding more precisely towards the grid's current needs, in particular towards the current grid conditions. If no reactive power has been predicted, reactive power can still be fed in, e.g., based on the current grid conditions.

According to one embodiment, it is proposed to set the reactive power via a reactive power function. This is preferably proposed for wind speeds ranging from the smallest wind speed of a storm to the largest acceptable wind speed of a storm. For this range, the reactive power function defines a correlation between the reactive power to be fed in and the wind speed. Said reactive power function is preferably a first or second-order polynomial function, i.e., a straight line with an incline or even a parabolic function. Preferably, a hysteresis function can be used that insofar defines a different correlation between reactive power and wind speed for rising wind speeds than for a declining wind speed. Preferably, such a hysteresis function can be realized through two different second-degree polynomial functions. Such functions are used preferably, but one may also use other functions, such as, for example, higher-order polynomial functions, trigonometric functions, such as the sections of a harmonic function, or spline functions describing a functional connection that is described via several points of support.

Preferably, the information provided by other wind turbines and/or other wind farms is used to prepare the wind forecast. One may also use the information provided by well-known meteorological services, in particular information on high and low pressure areas and corresponding large-scale general weather situations and airflows. It is, however, advantageous to use the information of at least one other wind turbine and/or wind farm, since wind turbines and wind farms may be connected through an information system, in particular through the so-called SCADA system. This makes it possible to set up a networked system that is, or may be, based on comparable weather information. Measuring the wind speed may, in particular, depend on numerous factors, especially on the sensor and height at which measuring is performed. If the wind turbine measures the wind speed, for example, with its aerodynamic rotor, such wind speed measurement is based on a very high measuring height, which nowadays may regularly exceed 100 meters, and it is based on a strongly homogenized parameter, since the aerodynamic rotor is comparatively inert—at least compared to a common anemometer that over-sweeps a large surface. By using the wind performance data of other wind turbines or wind farms, one ultimately takes as a basis the very wind performance values that become relevant and effective later on at the respective wind turbine.

What is moreover proposed is a wind turbine for feeding electrical energy into an electrical supply grid, which wind turbine is prepared for performing a method pursuant to at least one of the described embodiments. Preferably, such wind turbine comprises a generator that is designed to generate a generator nominal power, and it comprises a feed-in device that is prepared for performing the feeding process. Said feed-in unit is designed to feed a maximum feed-in current that is greater than a feed-in current for feeding the generator nominal power.

The wind turbine is insofar prepared for feeding a greater current than necessary to feed only the permanent maximum power of the generator into the grid.

Preferably, the feed-in device comprises several feed-in units, namely more feed-in units than necessary for feeding the power that can be generated by the wind turbine, i.e., in particular, more feed-in units than necessary for feeding the generator nominal power. Preferably, such feed-in units are provided as power cabinets; i.e., at least one more power cabinet than necessary is provided for feeding the nominal power or the maximum power that can be permanently generated. This way, it is possible to specifically feed in reactive power, while at the same time feeding in nominal power. Also, in extreme cases where no or only little nominal power is fed in, it is thus possible to feed in more reactive power than nominal power. For purposes of this comparison between reactive power and nominal power, the unit VAr is equated with the unit W.

It is moreover proposed to provide for a wind farm for feeding electrical energy into an electrical supply grid. Said wind farm is prepared for using a method pursuant to at least one of the above-described embodiments of the feeding process for feeding purposes.

Preferably, such wind farm comprises a central control unit for controlling the wind farm. Method steps for performing the feeding process are implemented accordingly on the central control unit. This means at least according to one embodiment that the central control unit provides values to the wind farm's individual wind turbines telling them what active power and what reactive power is to be fed in by the respective wind turbine. Such wind turbine factually realizes the feeding of the active power and/or reactive power by each individual wind turbine, or it rather performs its portion of the feeding of the entire wind farm. In this respect, each wind turbine contributes a feed-in current that complies with the specifications of the central control unit, wherein all of these individual feed-in currents are added and fed into the grid at the wind farm's point of common coupling.

Preferably, the wind farm is designed for feeding a greater current than necessary for feeding the maximum active power for which the wind farm is designed. Such maximum active power may, in particular, correspond to the wind farm's nominal power, i.e., to the sum of all nominal powers of the wind farm's wind turbines. Said wind farm can thus feed in more reactive power than active power, or, rather, it can still feed in reactive power even if the maximum amount of active power is fed in.

Preferably, the wind farm comprises several wind turbines, as described hereinabove in connection with at least one embodiment of a wind turbine. Preferably, all of the wind turbines are wind turbines of the type described above pursuant to at least one embodiment.

BRIEF DESCRIPTION OF THE SEVERAL VIEWS OF THE DRAWINGS

The invention is described in more detail below based on exemplary embodiments, with reference to the accompanying figures.

DETAILED DESCRIPTION

Figure 1:
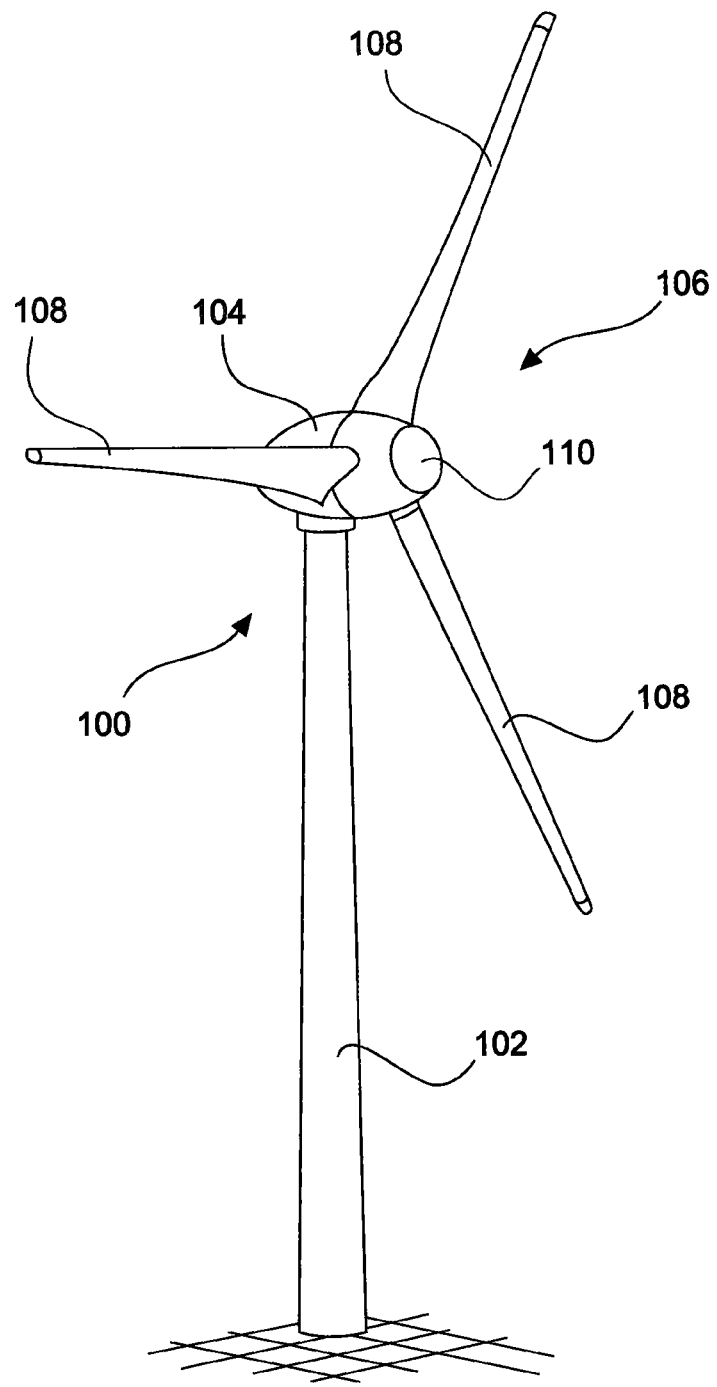
FIG. 1 shows the schematic perspective view of a wind turbine.

FIG. 1 shows a wind turbine 100 with a tower 102 and nacelle 104. A rotor 106 with three rotor blades 108 and a spinner 110 is located on the nacelle 104. When in operation, the rotor 106 is brought to a rotating movement by the wind and thereby drives a generator in the nacelle 104.

Figure 2:
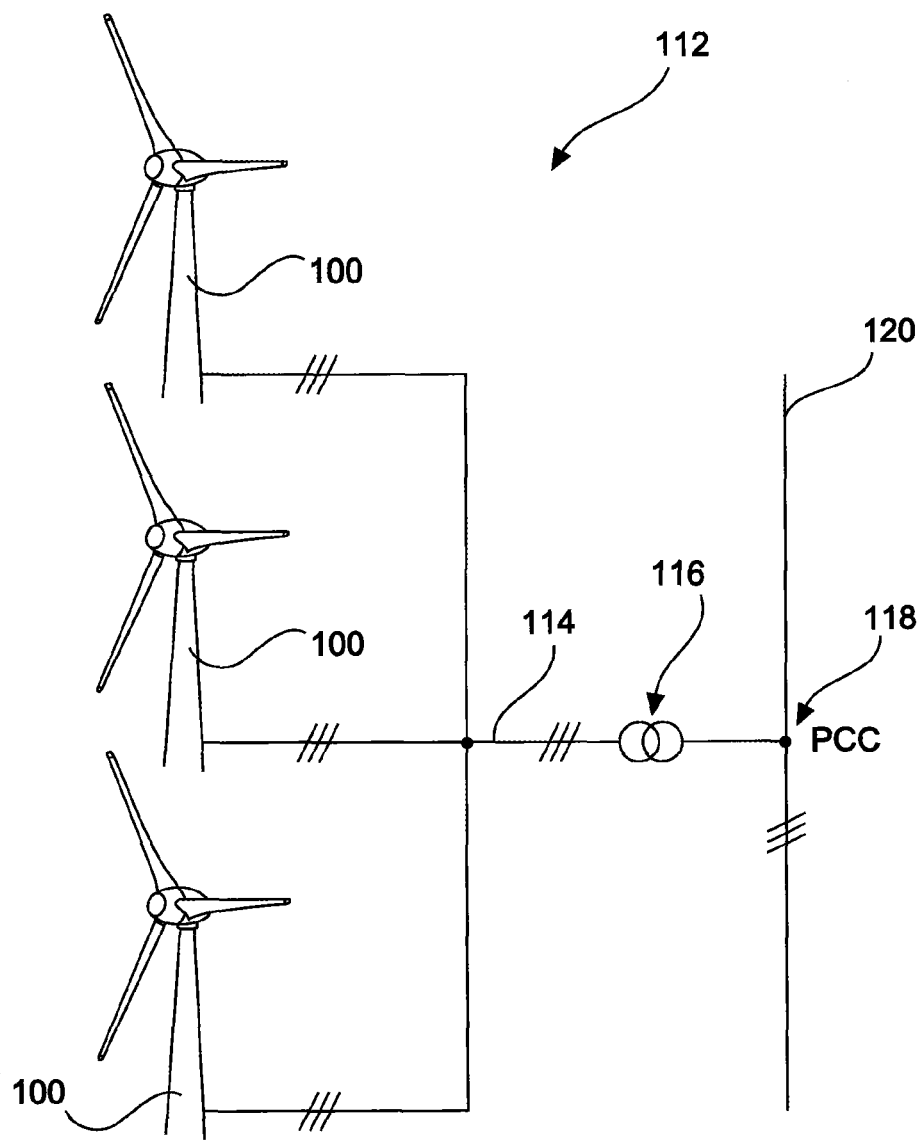
FIG. 2 shows the schematic view of a wind farm.

FIG. 2 shows a wind farm 112 with, for example, three wind turbines 100, which may be the same or different. The three wind turbines 100 are thus representative of a basically random number of wind turbines of a wind farm 112. The wind turbines 100 provide their power, in particular the generated electricity, via an electrical wind farm grid 114. The currents or powers, respectively, generated by the individual wind turbines 100 are added up. Most often, a transformer 116 will be provided, which transports the voltage at the wind farm to then feed it into the supply grid 120 at the feeding point 118, which is also generally referred to as a PCC. FIG. 2 is merely a simplified illustration of a wind farm 112, which does not show, for example, a control, although a control exists, of course. Also, the wind farm grid 114 may be designed differently, including, for example, a transformer at the output of each wind turbine 100, to mention just one other embodiment.

Figure 3:
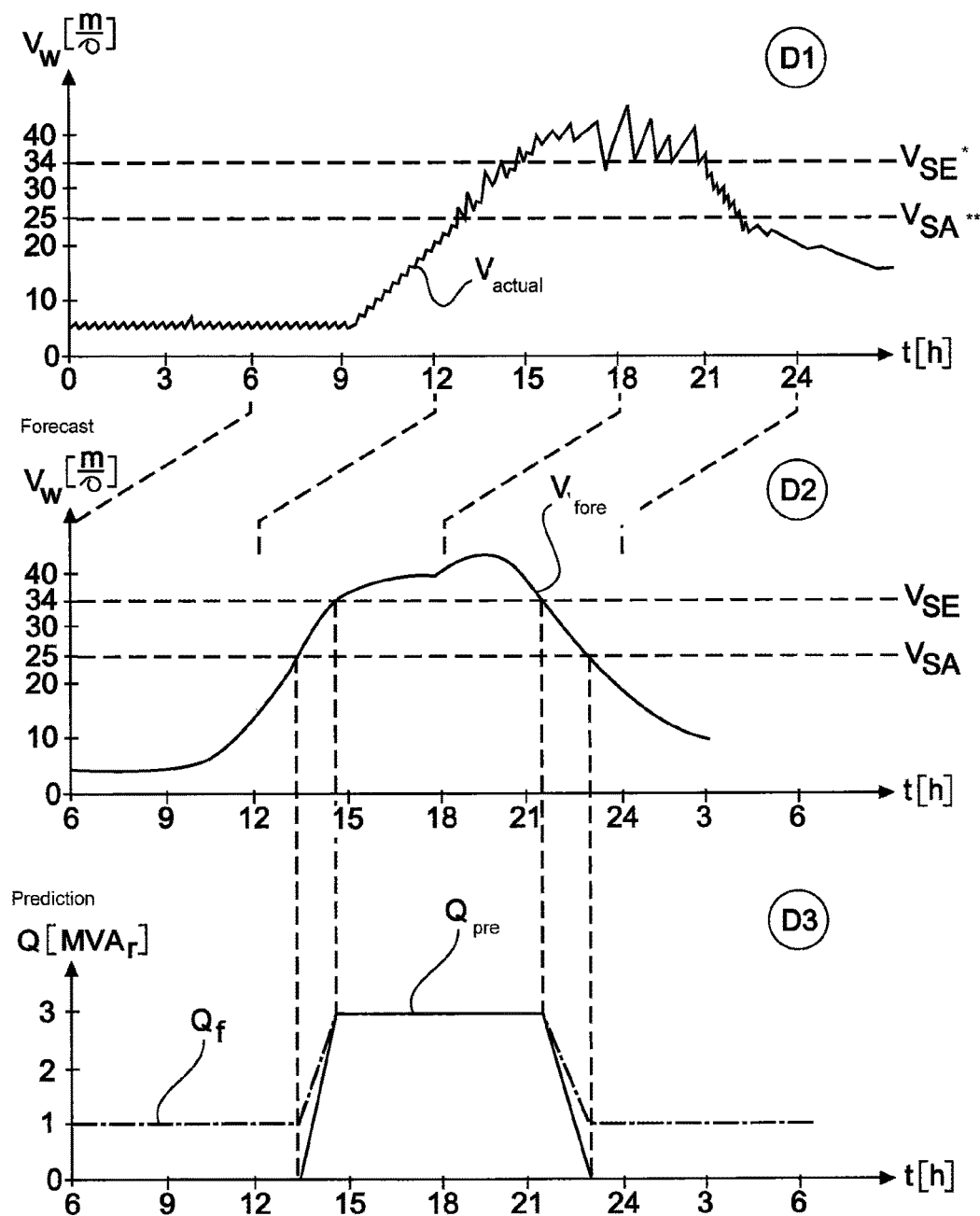
FIG. 3 shows diagrams that illustrate the correlation between actual wind, wind forecast and predicted reactive power.

In a first diagram D1, FIG. 3 shows one possible course of the wind speed, for example over the course of one day. The middle diagram D2 provides a possible wind forecast in this respect, which in the example shown, that is provided for illustration purposes, is based on a forecast period of six hours. The middle or second diagram D2 is thus six hours ahead. A correlation between the times of the forecasts and the times of the actual wind pursuant to the first diagram D1 is indicated by dashed lines that visually link the times six hours, 12 hours, 18 hours and 24 hours.

The bottom diagram, namely the third diagram D3, indicates one possible course of a prediction of the reactive power Q that is to be fed in.

For illustration purposes, the course of a wind speed $V_{actual}$ was selected showing a wind speed of around five meters per second in the range between 0:00 and 9:00 a.m. This equals a wind force of around three Bft. The wind speed is not shown as an even line, in order to indicate natural wind fluctuations.

At 9 a.m., the wind speed starts to slowly rise and reaches 25 meters per second at around 12:30 p.m. This equals a wind force of around 9 to 10 Bft. Normally—and in the example shown—, 25 meters per second is the wind speed at which the wind turbine is throttled for its own protection. Here, it constitutes the smallest wind speed of a storm $V_{SA}$.

The wind picks up even more and reaches 34 meters per second at around 14:30 p.m., which equals a wind force of 12 and thus a hurricane. 34 meters per second is also the wind speed at which the wind turbines no longer feed in active power—normally, and in the example shown—and are thus fully turned off, and where they have, in particular, turned their rotor blades to vane position, if possible. Here, said wind speed of 34 meters per second is the largest acceptable wind speed of a storm.

Around 9:00 p.m., the wind starts to drop and falls below the largest acceptable wind speed of a storm and then around 10:00 p.m. below the smallest wind speed of a storm. This means that as from 10:00 p.m., the wind turbine can be operated normally in terms of that it does not have to be throttled. The diagram also tries to illustrate that the fluctuation of the wind speed will also increase with higher wind speeds.

For said wind speed of diagram D1, a wind forecast is shown in diagram D2 that forecasts a wind speed of around 5 meters per second (wind force 3) for the period from 6:00 a.m. to 9:00 a.m. At 9:00 a.m., the wind speed increases according to the forecast and reaches a smallest wind speed of a storm of 25 meters per second at around 1:30 p.m. This is around one hour later than according to the later actual course pursuant to diagram D1, or, rather, the wind speed has been forecast to be lower at 12:30 p.m. than it actually is. At 2:30 p.m., the forecast wind speed reaches a largest acceptable wind speed of a storm of 34 meters per second. At 9:00 p.m., the forecast wind speed drops again below the largest acceptable wind speed of a storm, and at 11:00 p.m. it drops below the smallest wind speed of a storm.

Diagram D3 shows a prediction of the reactive power $Q_{pre}$ that is to be fed in. Its adjustment is geared towards the predicted wind speed pursuant to diagram D2. The predicted reactive power $Q_{pre}$ thus increases at 1:30 p.m., namely when the forecast wind speed reaches and exceeds the smallest wind speed of a storm $V_{SA}$. The predicted reactive power increases as the forecast wind speed increases further and reaches its maximum value at 2:30 p.m., when the forecast wind speed has reached the largest acceptable wind speed of a storm $V_{SE}$. Said predicted reactive power $Q_{pre}$ maintains its maximum value until the forecast wind speed drops again below the largest acceptable wind speed of a storm at 9:30 p.m., and the predicted reactive power $Q_{pre}$ also drops as the forecast wind speed keeps dropping until 11:00 p.m. At this point, the forecast wind speed reaches the value of the smallest wind speed of a storm and keeps dropping below it. The predicted reactive power $Q_{pre}$ reaches the value 0.

This shows that the predicted reactive power, which, in this respect, constitutes only a value at first, is determined based on the forecast wind speed $V_{fore}$. Preferably, said predicted reactive power $Q_{pre}$ is then fed in as predicted, later on, i.e., as shown in diagram 3. In other words: in the example shown, the increase in predicted reactive power and then the accordingly fed-in reactive power starts to increase only after 1:30 p.m., although the actual wind speed has reached the smallest wind speed of a storm $V_{SA}$ already at 12:30 p.m. Of course, the reverse may happen also, where a higher value is reached earlier by the forecast wind speed than by the actual wind speed. Preferably, it is proposed in general—i.e., not only for the exemplary embodiment of FIG. 3—to later on feed in a reactive power that equals the predicted reactive power $Q_{pre}$, if the actual wind speed is equal to or less than the forecast wind speed. In addition or alternatively, it is proposed also in general—i.e., not only for the exemplary embodiment shown—for the fed-in reactive power to be higher than the predicted reactive power if the actual wind speed is higher than the predicted wind speed. Here, it is proposed, however, not to exceed a maximum reactive power, i.e., not to increase the reactive power if the predicted reactive power has already reached such maximum value.

In diagram D3 in FIG. 3, the predicted reactive power in the period between 6:00 a.m. and 1:30 p.m. and between 11:00 p.m. and 6:00 a.m. is indicated as 0. Initially, this means either that a value of 0 is specified for the predicted reactive power and possibly transmitted to corresponding control units, or that no predicted reactive power at all is calculated for these periods, i.e., for the periods in which the forecast wind speed is below the smallest wind speed of a storm, and that, accordingly, no predicted reactive power or corresponding value is transmitted.

In such periods when no reactive power was predicted or its value is 0, reactive power can still be fed into the grid. Said reactive power depends, in particular, on grid conditions, such as the line voltage at the grid connection point or at another point in the electrical supply grid.

If reactive power has already been fed in, namely already before the wind speed or the forecast wind speed has reached the smallest wind speed of a storm, there are various ways of consolidating it with the predicted reactive power.

If a predicted active power becomes effective and rises—in this example at 1:30 p.m.—, it is proposed according to one embodiment to maintain such fed-in reactive power until the predicted reactive power reaches that very value of the presently fed-in reactive power. Then, the reactive power feed may switch to the course of the predicted reactive power.

According to another embodiment, it is proposed to increase the predicted reactive power at its low end to the already fed-in reactive power level, i.e., to compress it in the direction of the Y-axis so that the fed-in reactive power increases at 1:30 p.m. in the example shown when the predicted reactive power increases. This case is indicated by a dot-dashed head line in diagram D3 that illustrates the factually fed-in reactive power $Q_F$.

The example in FIG. 3 shows, moreover, a predicted reactive power $Q_{pre}$ and a factually fed-in reactive power $Q_f$ that both adopt a maximum value of 3 $MVA_r$. The example shown is based on a wind turbine that comprises a nominal power of 2 MW and can therefore generate and feed no more than 2 MW in active power on a permanent basis The wind turbine is nonetheless prepared for feeding a higher reactive power of 3 $MVA_r$, as shown in the example.

As regards the diagrams in FIG. 3, please note that they are based on an exemplary forecast period of six hours. However, other forecast periods are also generally possible, especially shorter forecast periods of one or only a few hours, or preferably even shorter forecast periods of less than 60 minutes, less than 30 minutes and/or less than 15 minutes. Preferably, such forecast periods are proposed in general, i.e., not only for the embodiment underlying the example in FIG. 3, but very generally.

Such a prediction of the reactive power to be fed in may be particularly helpful to the operator of the electrical supply grid, as it can help him to plan and design the grid control. The longer such feeding predictions, in particular reliable feeding forecasts, the greater the grid operator's freedom of control, because then he can include even such power stations in his planning that take longer to fully or partially power up or down. On the other hand, it is particularly short-notice changes—i.e., in relation to the underlying problem, short-notice changes in the feed-in performance of wind turbines—that may pose a problem to the grid operator's planning. If such abrupt problems are accompanied by equally abrupt predictions or abrupt and reliable forecasts, this may ease the grid operator's planning.

Figure 4:
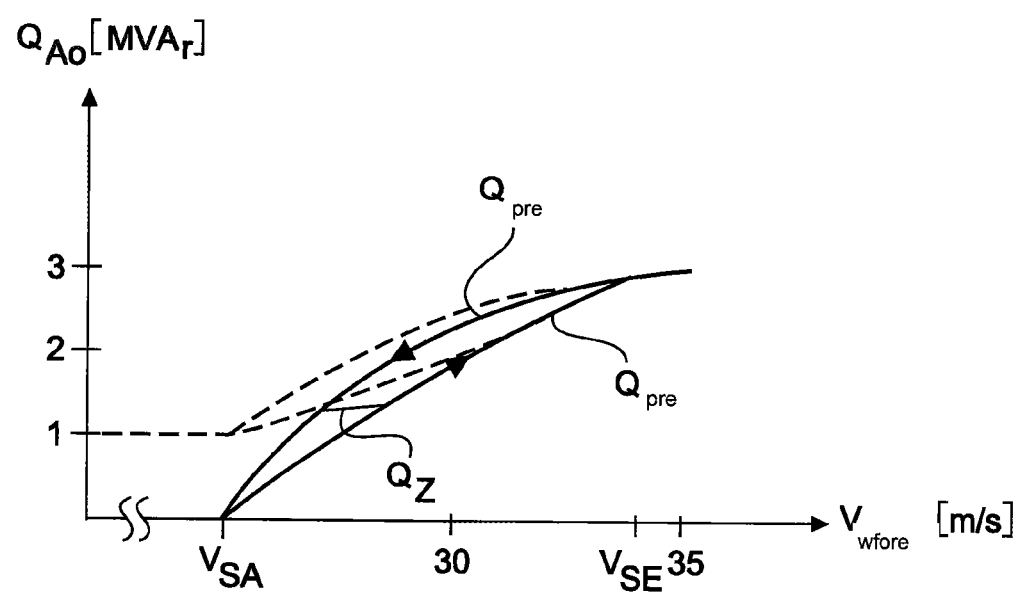
FIG. 4 shows a diagram that illustrates preferred correlations between predicted reactive power and forecast wind speed.

FIG. 4 shows a diagram that depicts the predicted reactive power $Q_{pre}$ based on the wind speed, namely on the forecast wind speed $V_{wfore}$ according to one embodiment. The illustration relates only to high wind speeds, namely, in essence, from the smallest wind speed of a storm $V_{SA}$ to the largest acceptable wind speed of a storm $V_{SE}$. In the example, the predicted reactive power $Q_{pre}$ rises with increasing wind speed according to a, for example, negative parabolic form until it reaches its maximum value at the largest acceptable wind speed of a storm $V_{SE}$. If the wind speed drops, the predicted reactive power will also drop. However, according to the example shown it will drop at a different curve, i.e., at a different course, than during the rise. Insofar, these two curves showing the predicted reactive power $Q_{pre}$ are furnished with directional arrows.

Should the wind speed change before it has reached the largest acceptable wind speed of a storm $V_{SE}$ while rising, or should it change before it has reached the smallest wind speed of a storm $V_{SA}$ while dropping, the predicted reactive power may switch to a horizontal course between the two depicted branches of $Q_{pre}$. Such horizontal course is exemplary shown as $Q_Z$. However, such horizontal course may basically occur at any point between these two curve branches. Such shifting between these two branches of the hysteresis function has the advantage that the reactive power will initially maintain a stable value, which will ensure a certain stability of control. Insofar, a shift between branches of a hysteresis function of the predicted reactive power is proposed such that the predicted reactive power maintains a constant value. This is generally proposed as an advantageous embodiment that is not limited only to the example shown in FIG. 4.

The invention claimed is:

1. A method for feeding electrical energy into an electrical supply grid by a wind turbine or wind farm, the method comprising:
    converting, using the wind turbine or wind farm, kinetic energy from wind with variable wind speed to electrical energy,
    predicting a wind speed based on a wind forecast,
    calculating a predicted reactive power to be fed in based on a predicted wind speed that is predicted over a forecast period, the predicted reactive power including a plurality of predicted reactive power values respectively corresponding to a plurality of time instances of the forecast period,
    feeding in, by the wind turbine or wind farm, the predicted reactive power at a point in the forecast period later than calculated, the feeding in including feeding in a predicted reactive power value of the plurality of predicted reactive power values later in the forecast period than a time instance respectively corresponding to the predicted reactive power value, and calculating an active power to be fed in as a predicted active power based on the predicted wind speed, and wherein:

the predicted reactive power is greater than the predicted active power when a wind speed is predicted to be greater than a mean storm wind speed lying between a first wind speed of a storm and a second wind speed of a storm, the first wind speed of the storm is a wind speed from which the active power is reduced when the wind speed increases, and the second wind speed of the storm is a wind speed at which the active power is no longer fed into the electrical supply grid.

2. The method according to claim 1, further comprising transmitting the predicted reactive power as a forecast value to a grid control center that controls the electrical supply grid.

3. The method according to claim 2, wherein the predicted reactive power is calculated as the forecast value and transmitted as such to the grid control center only when the predicted wind speed is greater than the first wind speed of the storm.

4. The method according to claim 1, wherein:

between the first wind speed of the storm and the second wind speed of the storm, the reactive power is set by a reactive power function that defines a connection between the reactive power and the wind speed, wherein the reactive power function is at least one of:
a first or second-order polynomial function, and
a hysteresis function.

5. The method according to claim 1, wherein the wind forecast is prepared based on information provided by at least one other wind turbine or wind farm.

6. A wind turbine for feeding electrical energy into an electrical supply grid using the method according to claim 1.

7. The wind turbine according to claim 6, wherein the wind turbine:

comprises a generator that is designed for generating a generator nominal power, and a feed-in device, wherein said feed-in device feeds a maximum feed-in current that is greater than a feed-in current for feeding the generator nominal power.

8. The wind turbine according to claim 7, wherein the feed-in device comprises a plurality of feed-in units, and wherein more feed-in units are provided than utilized for feeding the generator nominal power.

9. The wind turbine according to claim 8 wherein the plurality of feed-in units are power cabinets.

10. A wind farm for feeding electrical energy into an electrical supply grid, wherein the wind farm is prepared for performing the method according to claim 1.

11. The wind farm according to claim 10, wherein the wind farm comprises:

a central control unit for controlling the wind farm, and wherein the feeding in is implemented on said central control unit.

12. The wind farm according to claim 10, wherein the wind farm is configured to feed a larger current than a current required for feeding a maximum active power for which the wind farm is designed.

13. The wind farm according to claim 10, comprising a plurality of wind turbines.

* * * * *